United States Patent
Arango et al.

(10) Patent No.: US 12,201,979 B2
(45) Date of Patent: *Jan. 21, 2025

(54) SIMPLE FLOW CONTROL FOR MICROFLUIDIC DEVICES

(71) Applicant: International Business Machines Corporation, Armonk, NY (US)

(72) Inventors: Yulieth Cristina Arango, Zurich (CH); Emmanuel Delamarche, Thalwil (CH); Onur Gökçe, Zurich (CH); Yuksel Temiz, Zug (CH)

(73) Assignee: International Business Machines Corporation, Armonk, NY (US)

( * ) Notice: Subject to any disclaimer, the term of this patent is extended or adjusted under 35 U.S.C. 154(b) by 796 days.

This patent is subject to a terminal disclaimer.

(21) Appl. No.: 15/959,194

(22) Filed: Apr. 21, 2018

(65) Prior Publication Data

US 2019/0321819 A1  Oct. 24, 2019

(51) Int. Cl.
*B01L 3/00* (2006.01)

(52) U.S. Cl.
CPC ..... *B01L 3/50273* (2013.01); *B01L 3/502715* (2013.01); *B01L 3/502746* (2013.01);
(Continued)

(58) Field of Classification Search
CPC ......... B01L 3/502738; B01L 3/502746; B01L 2300/0851; B01L 2400/0427;
(Continued)

(56) References Cited

U.S. PATENT DOCUMENTS

| | | | |
|---|---|---|---|
| 7,283,696 B2 | 10/2007 | Ticknor et al. | |
| 9,207,249 B2 | 12/2015 | Greenstein et al. | |

(Continued)

FOREIGN PATENT DOCUMENTS

WO   2008124046 A1   10/2008

OTHER PUBLICATIONS

Morishita, S. et al. "Integration of EWOD pumping device in deep microfluidic channels using a three-dimensional shadowmask," 2012 IEEE 25th International Conference on Micro Electro Mechanical Systems (MEMS), p. 1045-1048. (Year: 2012).*

Arango, Y. et al. "Electrogates for stop-and-go control of liquid flow in microfluidics," Appl. Phys. Lett. 112, 153701 (2018); Published Online: Apr. 9, 2018. (Year: 2018).*

Michael G Pollack et al., Applications of electrowetting-based digital microfluidics in clinical diagnostics, Expert Review of Molecular Diagnostics vol. 11, 2011—Issue 4, pp. 393-407 | Published online: Jan. 9, 2014, Abstract Only pp. 1-6.

(Continued)

*Primary Examiner* — Jennifer Wecker
*Assistant Examiner* — Michelle Adams
(74) *Attorney, Agent, or Firm* — Daniel Morris; Otterstedt & Kammer PLLC

(57) ABSTRACT

A microfluidic device includes a microchannel, which defines a flow path for a liquid. It further includes a liquid-pinning trench, which is arranged so as to form an opening that extends across the flow path. In addition, the device includes an electrode extending across the flow path so as to at least partly overlap the trench. The trench and overlapping electrode make up an electrowetting gate, which allows an efficient, reliable, and easy-to-implement flow control mechanism. In addition, such a mechanism requires relatively low actuation voltages (less than 10 V) to resume the liquid flow. Thus, a microfluidic chip having gates such as described herein can be controlled with a portable system, e.g., a smartphone connectivity. The present devices may notably be embodied as point-of-care diagnostic devices. Related devices, as well as methods of operation and methods of fabrication of such devices, are also disclosed.

16 Claims, 8 Drawing Sheets

(52) U.S. Cl.
CPC . *B01L 2200/027* (2013.01); *B01L 2300/0816* (2013.01); *B01L 2300/0861* (2013.01); *B01L 2400/0406* (2013.01); *B01L 2400/0427* (2013.01)

(58) Field of Classification Search
CPC ......... B01L 2400/082; B01L 2400/088; B01L 2400/0688; F16K 99/0042; F16K 99/0017; F16K 2099/0084; B81C 1/00063
See application file for complete search history.

(56) References Cited

U.S. PATENT DOCUMENTS

| | | | | |
|---|---|---|---|---|
| 11,524,292 | B2* | 12/2022 | Salva | B01L 3/502746 |
| 2008/0257438 | A1* | 10/2008 | Wang | B01L 3/502738 137/833 |
| 2011/0266151 | A1 | 11/2011 | Jansson | |
| 2015/0204817 | A1* | 7/2015 | Jansson | G01N 27/44791 204/450 |
| 2016/0273032 | A1 | 9/2016 | Esfandyarpour et al. | |
| 2018/0085756 | A1* | 3/2018 | Kosaka | G01N 27/44786 |
| 2018/0272348 | A1* | 9/2018 | Azpiroz | B01L 3/502715 |

OTHER PUBLICATIONS

Bobak Mosadegh et al., Integrated elastomeric components for autonomous regulation of sequential and oscillatory flow switching in microfluidic devices, Nature Physics vol. 6, pp. 433-437 (2010), Published: Apr. 18, 2010, pp. 433-437.

C. Quilliet and B. Berge, Current Opinion in Colloid & Interface Science vol. 6, Issue 1, Feb. 2001, pp. 34-39, abstract only pp. 1-2.

Y.-P. Zhao and Y. Wang, Fundamentals and Applications of Electrowetting: A Critical Review, Rev. Adhesion Adhesives, vol. 1, No. 1, Feb. 2013, pp. 114-174.

Romi Shamai et al., Water, electricity, and between . . . On electrowetting and its applications, Soft Matter 2008, 4, p. 38-45, Royal Society of Chemistry 2008.

Wataru Satoh et al., Electrowetting-based valve for the control of the capillary flow, Journal of Applied Physics 103, 034903 (2008), abstract only pp. 1-11.

He, F. & Nugen, S.R. Microfluid Nanofluid (2014) 16: 879. https://doi.org/10.1007/s10404-013-1317-3, abstract only pp. 1-8.

María Díaz-González et al., Multiple actuation microvalves in wax microfluidics, Lab on a Chip Issue 20, 2016, abstract only pp. 1-5.

Hyejin Moon and Sung Kwon Cho, Low voltage electrowetting-on-dielectric, Journal of Applied Physics 92, 4080 (2002); https://doi.org/10.1063/1.1504171, abstract only pp. 1-10.

Hyejin Moon and Sung Kwon Cho, Low voltage electrowetting-on-dielectric, Journal of Applied Physics 92, 4080 (2002); https://doi.org/10.1063/1.1504171, full paper cover plus pp. 4080-4087.

María Díaz-González et al., Multiple actuation microvalves in wax microfluidics, Lab on a Chip Issue 20, 2016, full paper pp. 1-8.

Wataru Satoh et al., Electrowetting-based valve for the control of the capillary flow, Journal of Applied Physics 103, 034903 (2008), full paper cover plus pp. 034903-1 through 034903-9.

He, F. & Nugen, S.R. Automating fluid delivery in a capillary microfluidic device using low-voltage electrowetting valves, Microfluid Nanofluid (2014) 16: 879. https://doi.org/10.1007/s10404-013-1317-3, full paper pp. 879-886.

* cited by examiner

SIMPLE FLOW CONTROL FOR MICROFLUIDIC DEVICES

BACKGROUND

The invention relates in general to the field of microfluidics. In particular, it is directed to microfluidic devices allowing flow control of liquid propagating in microchannels of the devices.

Microfluidics deals with the precise control and manipulation of small volumes of fluids that are typically constrained to micrometer-length scale channels and to volumes typically in the sub-milliliter range. Prominent features of microfluidics originate from the peculiar behavior that liquids exhibit at the micrometer length scale. Flow of liquids in microfluidics is typically laminar. Volumes well below one nanoliter can be reached by fabricating structures with lateral dimensions in the micrometer range. Microfluidic devices generally refer to microfabricated devices, which are used for pumping, sampling, mixing, analyzing and dosing liquids.

Many microfluidic devices have user chip interfaces and closed flow paths. Closed flow paths facilitate the integration of functional elements (e.g., heaters, mixers, pumps, UV detector, valves, etc.) into one device while minimizing problems related to leaks and evaporation. The analysis of liquid samples often requires a series of steps (e.g., filtration, dissolution of reagents, heating, washing, reading of signal, etc.). Metallic electrodes are sometimes patterned in channels of the device.

Microfluidics has opened the door for applications in many areas of healthcare and life sciences, such as point-of-care diagnostics (POCDs), environmental analysis, and drug discovery. POCDs strongly benefit from microfluidic technologies due to the miniaturization of tests, which enhances portability and the integration of various functions into one diagnostic device. For instance, many lateral flow assay tests rely on microfluidic functions and microfabrication to increase their precision and multiplexing capabilities.

However, one major limitation of POCD devices is the lack of flexibility in defining/changing assay conditions on the fly because flow paths are typically encoded on a design level and set during microfabrication. This translates into devices that should be operated according to a well-defined protocol and where flow rates and volumes of displaced liquids cannot easily be changed during operation without using active micro-components. There is accordingly a need for more flexible microfluidic devices.

Besides, several liquid actuation mechanism are known, which are implemented in microfluidics. In particular, electrowetting principles are already used for controlling the shape and movement of droplets of liquids, albeit with challenging fabrication processes and the use of large actuation voltages, which are typically larger than 10V. Electrowetting and electrostatic actuation mechanisms have been proposed for resuming a liquid flow in a capillary-driven microfluidic channel, where the liquid is first stopped by a capillary burst valve or a hydrophobic barrier. However, such devices require large actuation voltages, making them unsuitable for a range of microfluidic applications.

The following papers illustrates the background art:
C. Quilliet and B. Berge, Curr. Opin. Colloid Interface Sci. 6, 34 (2001).
Y.-P. Zhao and Y. Wang, Rev. Adhes. Adhes. 1, 114 (2013).
R. Shamai, D. Andelman, B. Berge, and R. Hayes, Soft Matter 4, 38 (2008).
W. Satoh, H. Yokomaku, H. Hosono, N. Ohnishi, and H. Suzuki, J. Appl. Phys. 103, (2008).
F. He and S. R. Nugen, Microfluid. Nanofluidics 16, 879 (2014).

SUMMARY

According to a first aspect, the present invention is embodied as a microfluidic device. The device comprises a microchannel, which defines a flow path for a liquid. It further includes a liquid-pinning trench, which is arranged so as to form an opening that extends across the flow path. A depth of the trench extends transversally to a flow direction imposed to the liquid by the microchannel, in operation. In addition, the device comprises an electrode extending across the flow path so as to at least partly overlap the trench in the flow path. The trench and overlapping electrode make up what is here termed an electrowetting gate, which allows an efficient, reliable, and easy-to-implement flow control mechanism, thus improving the flexibility of traditional microfluidic devices. In addition, such a mechanism requires relatively low actuation voltages (less than 10 V) to resume the liquid flow. Thus, a microfluidic chip having gates such as described above can be controlled with a portable system, e.g., a smartphone connectivity. The present devices may notably be embodied as point-of-care diagnostic devices.

In embodiments, the trench extends across a bottom wall of the microchannel. I.e., the flow path is defined by walls of the microchannel, which include a bottom wall and lateral walls, the latter arranged on each side of and contiguous with the bottom wall, across which the trench extends.

Preferably, the trench has a curvature, so as to improve retention times at the trench. That is, the opening of the trench has a convex profile across the bottom wall of the microchannel (as seen from the liquid reaching the trench). Said profile forms acute external angles with the lateral walls of the microchannel, in a plane subtended by the bottom wall and at intersections between said bottom wall and said lateral walls.

More generally, several improvements can be contemplated to improve the stability of the pinned liquid. For example, the opening may have a curvilinear profile, rather than a polygonal profile. Said curvilinear profile may for instance be semi-circular and the radius of curvature of the profile may be larger than a half width of the microchannel. The radius of curvature and the width of the channel are measured in the plane subtended by the bottom wall of the microchannel (the width of the channel is measured transversally to the flow direction, as usual). In addition, the trench preferably has a constant depth, which is larger than or equal to 0.9 μm (or more preferably larger than 1.4 μm). The depth of the trench is measured perpendicularly to the plane of the bottom wall of the microchannel.

In preferred embodiments, the electrode coats, at least partly, one or more walls of the trench and/or one or each of the longitudinal edges (i.e., the longer edges) that define the opening of the trench. That is, the electrode is patterned after opening the trench, to ease the fabrication process.

The electrode may notably coat the upstream edge of the opening (at least partly, for example at the level of its apex), which allows the liquid flow to be more efficiently resumed, by electrowetting, because the electrode extends in that case to the edge where the liquid is pinned. The electrode may further advantageously coat the opposite (downstream) edge, to help the liquid to pass the second edge when resuming the flow. Additional benefits are observed if the electrode further coat the longitudinal edges of the opening at the level of the external angles formed with the lateral walls of the channel. Thus, the electrode may advantageously coat all the features of the trench.

If the electrode is patterned after opening the trench, then the electrode may coat (at least partly) a bottom wall of the trench, wherein the bottom wall of the trench is parallel to the bottom wall of the microchannel. In addition, the electrode may possibly coat (at least partly) one or each of opposite sidewalls of the trench, the latter contiguous with and on each side of the bottom wall of the trench. The electrode may for example be patterned as a metal strip extending across the flow path, so as to coat, at least partly, the bottom wall of the trench and one or each of the opposite walls of the trench. An adhesion layer may however be necessary, depending on the materials otherwise used.

In other embodiments, the microfluidic device comprises a substrate; the electrode is formed as a layer on top of the substrate. The device further includes a layer of dielectric material that partly covers the substrate, so as to form the bottom wall of the microchannel. Thus, the trench can be formed within the layer of dielectric material, so as for the trench to reach the layer forming the electrode.

In still other embodiments, the microfluidic device comprises an electrically conductive substrate, which is configured as said electrode in the device. The device further includes a layer of dielectric material that partly covers the substrate, so as to a form the bottom wall of the microchannel, and the trench is formed through the layer of dielectric material, so as to reach into the conductive substrate.

Incidentally, the trench may possibly comprise a hydrophobic material coating, to enhance the stopping capability of the gate. I.e., assuming the trench comprises a bottom wall and opposite sidewalls (contiguous with and on each side of the bottom wall of the trench), one or each of the opposite sidewalls may be coated with a hydrophobic material layer.

The device may typically comprise a second electrode, the latter electrically insulated from the first electrode and configured so as to be contacted by a liquid introduced in the microchannel, in operation. Yet, any suitably placed conductive part of the device may play the role of the second electrode. In addition, the device is typically provided with voltage control means connected to the first and second electrodes and configured to apply a direct current (DC) voltage between the first and second electrodes.

In embodiments, the microfluidic device is provided with multiple gates, each arranged along a same flow path. I.e., the device comprises a set of liquid-pinning trenches, each arranged so as to form a respective opening that extends across the flow path and has a respective depth that extends transversally to the flow direction, as well as a corresponding set of first electrode contacts, each extending so as to at least partly overlap a respective one of the trenches. The first electrode contacts are connected, so as to form a single, common electrode. Interestingly, flow control can be achieved throughout the various gates via the same, common electrode.

In embodiments, the microchannel further comprises a cover extending opposite to its bottom wall, with respect to its lateral walls, and the cover comprises an aperture suited for introducing liquid in the microchannel.

Preferably, the (first) electrode comprises a metal layer with a self-assembled monolayer of molecules arranged thereon, to make the electrode more hydrophobic. In variants, the device may comprise an array of microstructures arranged on the electrode and/or on the flow path (but contiguously with said electrode).

According to another aspect, the invention is embodied as a method for controlling a flow of liquid in a microfluidic device such as described above. The method basically revolves around introducing a liquid in the microchannel, for it to advance along the flow path and get pinned at the trench, and applying a DC voltage to the pinned liquid, via said electrode, for the liquid to overcome the trench and further advance along the flow path. The electrode and the trench form a gate. The DC voltage may for instance be applied between said electrode and a second electrode, suitably arranged in the device, as discussed above.

The device may possibly comprise a set of gates arranged along the same flow path, where all gates are similarly configured with a trench and an electrode contact, as evoked above. Again, electrode contacts can be connected so as to form a single, common electrode, such that DC voltage pulses can be applied via the common electrode. Namely, a first direct current voltage pulse can be applied for the liquid to overcome a first trench of the first gate, further advance along the flow path, and reach a second trench of a second gate of the set, where it gets pinned. Then, a second direct current voltage pulse may be applied to the pinned liquid (again via the common electrode) for the liquid to overcome the second trench and further advance along the flow path, and so on.

According to a final aspect, the invention is embodied as a method of fabrication of a microfluidic device such as described above. This fabrication method aims at fabricating a microchannel that includes a liquid-pinning trench and an electrode contact such as described above. This is preferably achieved by: depositing a layer of material to form a bottom wall of the microchannel; opening the trench in the deposited layer of material; and patterning the electrode contact on top of the opened trench, for the electrode contact to coat, at least partly, a bottom wall of the trench.

Devices, systems and methods embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which:

FIG. 1A is a side view showing elements of the device forming the flow path and the gate with a liquid pinned at the gate (not voltage is applied yet);

FIG. 1B shows a magnified view of the liquid pinned at the gate, in the plane of FIG. 1A;

FIG. 1C is a top view of the channel and the gate, showing the angle α between the lateral wall and the tangent of the opening of the trench near the lateral wall; and FIG. 1D is another side view showing the flow resumed after activation of the gate, upon applying a voltage;

Figure 1A:
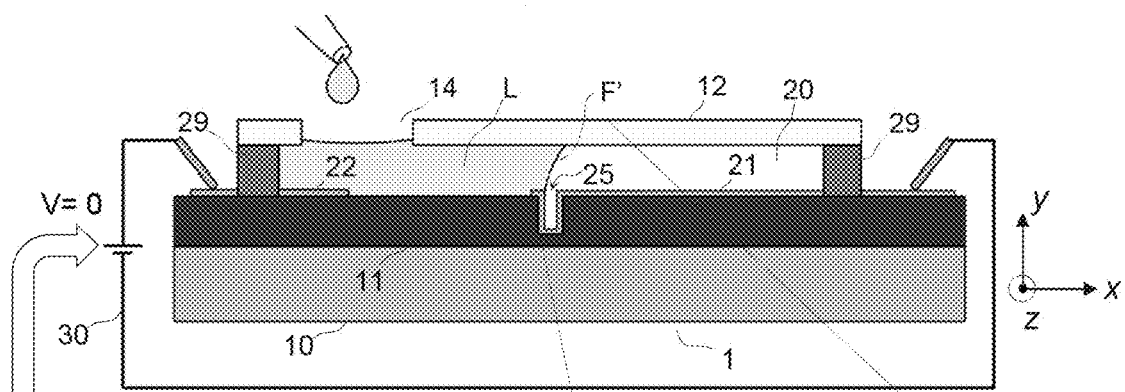
FIGS. 1A-1D illustrate the operation principle of a capillary-driven microfluidic device comprising a microchannel with a gate that includes a trench and an electrode overlapping the trench, according to embodiments. In detail.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION

The present Inventors set the goal of achieving microfluidic devices that are more flexible in terms of flow control. They have accordingly devised a concept based on electrowetting, which is particularly attractive as it does not require complex mechanical elements such as pumps or valves. As several stop-and-go flow control mechanisms are emerging, a main challenge in developing an efficient implementation is to identify a simple but reliable flow stopping mechanism, enabling a fast, efficient, low power and low voltage electrowetting-based actuation to resume the liquid flow. The solution developed by the Inventors provides simple and reliable flow stopping mechanism, which can easily be fabricated and operated.

The following description is structured as follows. First, general embodiments and high-level variants are described (sect. 1). The next section addresses more specific embodiments and technical implementation details (sect. 2).

1. General Embodiments and High-Level Variants

In reference to FIGS. 1, 2, and 6-8, an aspect of the invention is first described, which concerns a microfluidic device 1, 1a, 1b. Such a device generally comprises a microchannel 20, which is configured so as to define a flow path for a liquid L meant to be introduced in the channel 20, in operation of the device. The device further includes a gate, sometimes referred to as an "electro-gate" in this document. This gate comprises a liquid-pinning trench 25, arranged so as to form an opening 25o that extends across the flow path defined by the channel 20. A depth of the trench 25 extends transversally to the flow direction imposed to the liquid by the channel 20, in operation. The gate further includes an electrode 21 (or an electrode contact) that extends across the flow path. The electrode 21 overlaps, at least partly, with the trench 25.

This device is operated by introducing a liquid L in the microchannel 20, for the liquid to advance along the flow path and get pinned at the trench 25. Then, a direct current (DC) voltage can be applied to the pinned liquid L, via the electrode 21, for the liquid L to overcome the trench 25 and further advance along the flow path. E.g., a DC voltage pulse is applied between the pinned liquid L and the gate, via the (first) electrode 21 and a second electrode 22. Thus, the gate 21, 25 enables simple flow control.

The microchannel 20 (also referred to as a "channel") is typically formed as a groove on a main surface of a substrate 10. The substrate is for instance an essentially planar object, such as a chip, a wafer or any such planar support. However, the substrate may include various structures formed thereon, in particular microstructures and other microfluidic features, such as capillary pumps, anti-wetting structures 16, flow resistors 17, and vents 19. A characteristic dimension (e.g., width or depth) of the channel 20 and other microfluidic features 16, 17, 19 is in the micrometer-length range, i.e., typically between 1 µm and 200 µm. Yet, some particular structures of the present devices 1, 1a, 1b may be in the nanoscale range or in the millimeter range, the devices as a whole typically being in the centimeter range.

The microchannel 20 and the device 1, 1a, 1b are here preferably designed so as to allow capillary-driven flows of liquids. Therefore, the flow path is preferably wetting for typical liquids as used in point-of-care devices or microfluidic devices. Various capillary pumps may accordingly be involved, along and/or downstream from the flow path. Still, the present concepts can be extended to liquid flows urged along a non-wetting flow path. For example, such gates can be used as pressure barriers in pressure-driven (i.e., active pumping) or centrifugal (i.e., Lab-on-a-Disk) microfluidic platforms.

The trench 25 is a depression, i.e., a cavity that extends from the flow path and transversal thereto. That is, the depth of the trench extends transversally (e.g., perpendicularly) to the flow direction defined along the flow path. On the other hand, the opening 25o formed by the trench 25 extends across the flow path, i.e., over the whole width (measure along axis z) of the channel 20. The trench 25 defines an opening 25o that extends across the flow path and interrupts the latter, so as to pin a liquid L at the upstream edge of the trench 25. The trench 25 can be regarded as a slit, i.e., a rather long and narrow cut that typically has a rectangular cross-section. I.e., its length (as measured in the plane (x, z))

is likely larger than its width (measured along x), which itself is typically larger than its depth (along y).

The electrode 21 preferably coats the trench 25, at least partly. In variants, the trench is opened so as to reach the electrode layer, as discussed later in detail. In all cases, the electrode 21 comprises a part (i.e., a terminal contact) that extends across the flow path so as to at least partly overlap features of the trench 25. Namely, the electrode contact 21 covers one or more longitudinal edges (i.e., the longer edges of the opening 25o) and/or one or more walls (sidewalls, bottom wall) of the trench 25, or form a bottom wall of the trench 25. Preferably, the electrode 21 coats an upstream edge of the trench 25 and/or angles formed between the trench 25 and lateral walls of the channel 20, as described below in detail.

The configuration of the electrode 21 and the trench 25 as proposed here markedly differs from that of a capillary burst valve. Indeed, the liquid pinning structures (edges) of a capillary burst valve are flared in-plane with the inlet channel, which, as one may realize, makes it difficult to pattern electrodes on the out-of-plane walls of the valve that form the pinning edges. In addition, when resuming the liquid flow, liquid that passes the pinning edges of the valve fills the larger (in-plane) area formed by the valve, leading to longer reaction times. On the contrary, the present gates 21, 25 involves trenches having a transversal depth, in which no liquid gets trapped. Also, an electrode 21 can easily be patterned at or close to the pinning features of the trench. And when resuming the liquid flow by electrowetting, liquid that passes the pinning edges may instantaneously fill the outlet channel. Also, gate designs as proposed herein do not impose any additional hydraulic resistance to the flow path unlike conventional capillary burst valves, which typically require a substantial narrowing in the channel width.

As one understands, the present approach allows an efficient, reliable, and easy-to-implement flow control mechanism, which relies on simple geometrical pinning and electrode structures, and which can furthermore easily be fabricated using techniques known in the fields of microfluidics or point-of-care diagnostic (POCD) devices. Because it allows the electrode 21 to be more strategically positioned to resume the liquid flow, an additional benefit of the present approach is that the operation of the device requires relatively low actuation voltages (<10 V). Thus, a microfluidic chip having gates 21, 25 such as described herein can be controlled with a compact and portable system 50, e.g., via smartphone connectivity, as illustrated in FIGS. 1A-1D.

The flow path is defined by one or more walls 26-28 of the microchannel 20. In preferred embodiments, the channel 20 includes a bottom wall 26 and lateral (side) walls 27, 28. The lateral walls 27, 28 extend on each side of the bottom wall 26 and contiguous therewith, as assumed in FIGS. 1A-1D, 2 and 6-8. Thus, the opening 25o of the trench 25 extends across the bottom wall 26 of the channel 20, while the depth of the trench 25 extends transversally (e.g., perpendicularly) to the bottom wall 26, e.g., toward a substrate 10 underneath. Such a design eases the fabrication process of the channel 20 and the trench 25; the latter is more easily machined through the bottom wall 26 (e.g., through layers 10, 11 underneath). In variants, the trench 25 may extend across any of the walls 27, 28 or even a cover 12 of the channel 20. Such variants, however, makes it more difficult to process the trench. In less likely variants, the channel 20 may be designed as a conduit, i.e., it may not have distinct walls 26, 27, 28 but instead be defined by a single, continuous rounded wall, and the trench may be formed transversally to this wall.

As illustrated in FIGS. 1A-1D, the present devices 1, 1a, 1b typically include a second electrode 22 (i.e., an electrode contact). The electrode 22 is electrically insulated from the first electrode 21. The electrode 22 is otherwise suitably arranged in the device (e.g., in the microchannel 20), so as to be contacted by the liquid L introduced therein, in operation. The second electrode 22 is for example located in the vicinity of a liquid loading pad 14, as assumed in FIGS. 1A-1D. In variants, any electrically conductive part of the device 1, 1a, 1b may be relied upon, to play the role of a second electrode, provided this part is suitably located in the device and, so as to be in contact with the liquid L, in operation. Thus, there is no strict need to explicitly pattern a second electrode 22. The same actually holds true for the electrode 21, as later described in reference to FIG. 8. The second electrode 22 can also be implemented as an off-chip electrode (e.g., needle, probe, paperclip), adapted to be placed in the device, so as to contact the liquid, e.g., in the loading pad.

The microfluidic device 1, 1a, 1b is operated thanks to voltage control means 30, 50 connected to the first and second electrodes 21, 22. Such control means may notably include electrical circuit elements 30, suitably connected (or connectable) to electrodes 21, 22 of the device, e.g., via electrical pads 15. Such control means 30, 50 are preferably provided separately, though elements of the circuit (such as electrical traces, electrical pads 15, other contacts, etc.) are typically provided on the device 1, 1a, 1b, to ease the connectivity. In all cases, the control means 30, 50 need be configured to apply a direct current voltage to the liquid L, e.g., between the first and second electrodes 21, 22, so as to apply a DC voltage between the liquid L and the electrode 21 at the gate. Thanks to the low voltage biases required here, the gates 21, 25 formed by the trenches 25 and electrode contacts 21 may for example be controlled with a compact and portable system 50, e.g., using smartphone connectivity. To that aim, peripheral devices may be needed, as know per se.

Figure 2A:
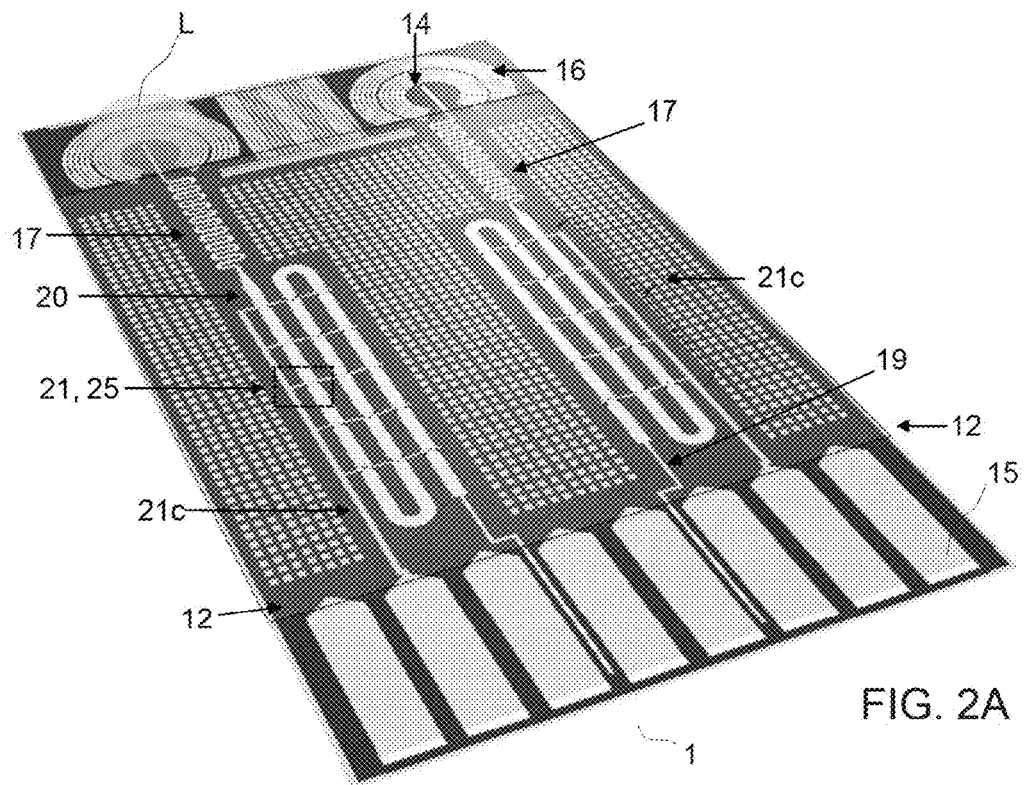
FIG. 2A is a 3D view of a microfluidic chip containing two independent flow paths and several gates per path. Gates in the parallel channels can be activated independently whereas those in a same channel can be sequentially activated via a common electrode, as in embodiments. Electrodes terminate with contact pads matching a microSD socket, as in embodiments.

As illustrated in FIG. 2A, the device 1 may possibly include several gates 21, 25 arranged along a same flow path. I.e., the device 1 may comprise a set of liquid-pinning trenches 25, each arranged so as to form a respective opening that extends across the flow path. A corresponding set of electrode contacts 21 extend, each, so as to at least partly overlap a respective one of the trenches 25. Interestingly, the electrode contacts 21 may be connected so as to form a single, common electrode 21c. The liquid flow may nevertheless be resumed (at each gate) by sequentially applying voltage pulses via this common electrodes, which eases the operation of the device. Namely, after having introduced a liquid L in the flow path, the liquid advances along the path to a first trench, where it is pinned. Then, a first DC voltage pulse may be applied via the common electrode 21c, for the liquid L to overcome the first trench 25 and further advance along the flow path. There, the liquid will reach a second trench 25, where it is again pinned. Then, a second DC voltage pulse may be applied (again via the common electrode 21c), for the liquid L to overcome the second trench 25 and further advance along the flow path, and so on. Such an approach allows a number of gates to be implemented, which is larger than the number of electrical pads 15. This can be advantageous, inasmuch as the number of pads 15 is typically limited by the chip size and the type of the socket. Several parallel flow paths may be involved (as assumed in FIG. 2A), as well as complex flow paths (e.g., intersections, etc.). As one understands, complex flow control can easily be achieved, thanks to simple mechanical parts (trenches, electrodes) and actuation (via common electrodes).

The present devices 1 typically include a cover 12, or lid. I.e., the channel 20 can be closed by any capping component 12 (typically having a flat lower surface). In the examples of FIGS. 1 and 2, the microchannel 20 is closed by a cover 12 that extends opposite to the bottom wall 26 of the channel (with respect to lateral walls 27, 28 and end sidewalls 29). The cover 12 preferably comprises an aperture 14 suited for introducing the liquid L in the microchannel 20, as illustrated in FIG. 1A. The cover 12 may for instance be a dry film resist, as in embodiments discussed in section 2. Such a cover 12 may possibly be sealed (e.g., by lamination) after fabrication of the device, e.g., at another location. Thus, the device may initially be provided without any cover 12. In addition, the cover may be removable, such that the devices may not systematically include a cover 12.

Figure 1B:
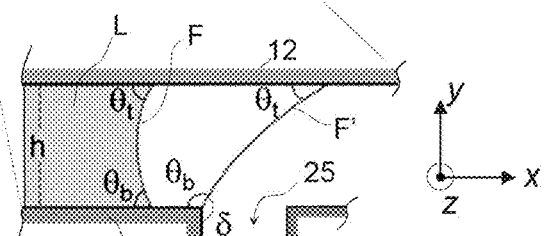
Figure 1C:
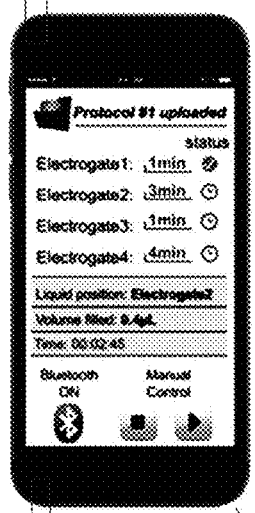
Figure 1C:
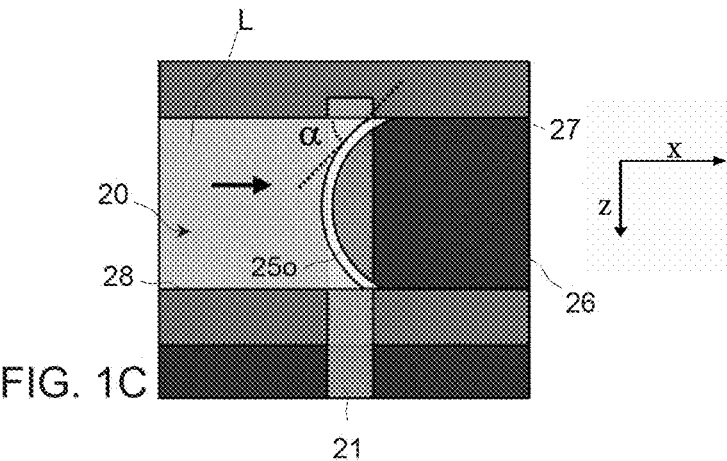
Figure 2B:
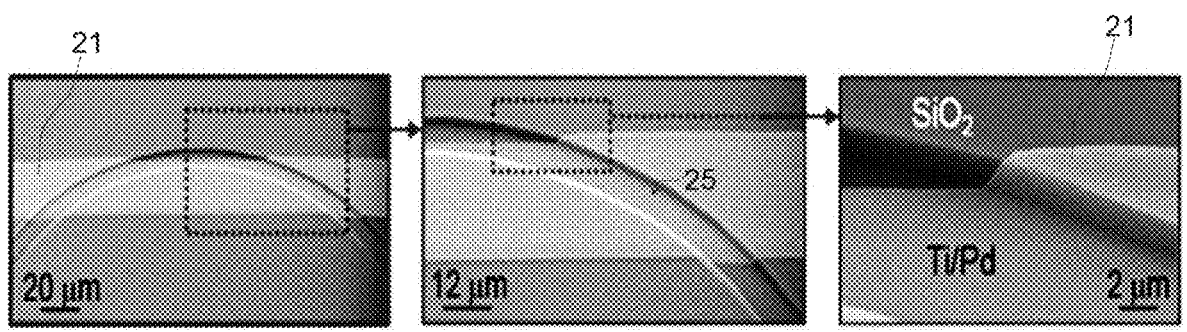
FIG. 2B are scanning electron microscope (SEM) images of a single gate comprising a curved trench with an electrode patterned thereon, as in preferred embodiments.
Figure 3:
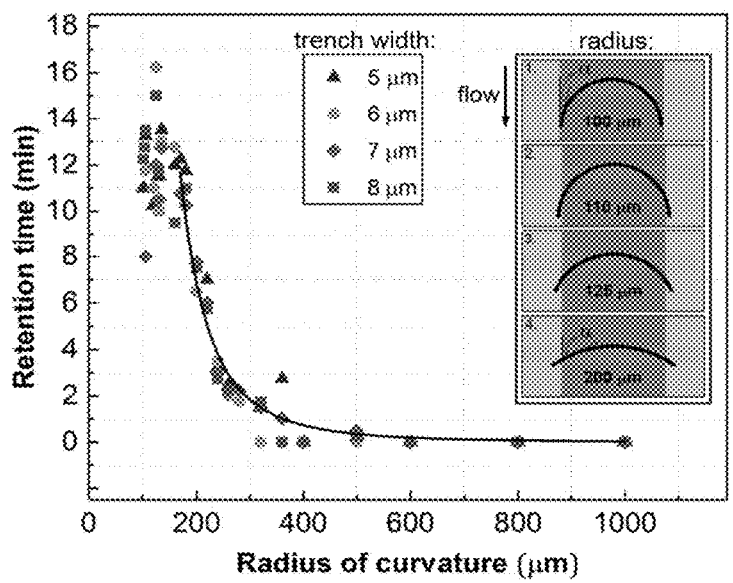
FIG. 3 illustrates geometrical variations of the radius of curvature of a curved trench and the effect on the retention capability of the gate for a PBS solution. The continuous line is a guide for the eye. The inset illustrates trenches having increasing radius of curvature.

Referring now to FIGS. 1C, 2B, and 3, the trench 25 preferably has a curvature. That is, the opening 25o of the trench exhibits a convex profile (as seen from the liquid L advancing toward the trench) across the flow path, e.g., across the bottom wall 26 of the microchannel 20, as assumed in the following. This profile refers either to the longitudinal edges of the opening 25o of the trench 25 (i.e., edges extending in (x, z), see FIG. 1C) or to the median edge of the opening 25o. I.e., the opening 25o opposes a convex shape to the liquid filling front.

This profile results in acute external angles $\alpha$ with the lateral walls 27, 28 of the channel 20. Such angles are measured in the plane of the bottom wall 26, at intersections between the bottom wall 26 and said walls 27, 28. Thus, the convex shape of the profile gives rise to an acute external angle $\alpha$ at each intersection. This, in turn, decreases the capillary pressure in the intersection regions and improves the stability of the pinning. More generally, a curved profile can be leveraged to improve the stability and, thus, the retention time of the liquid L at the upstream edge of the trench 25.

The profile of the opening 25o may be polygonal. Preferably though, the opening 25o has a curvilinear profile. This profile may for instance correspond to a circular arc (i.e., a minor arc of a circle). Yet, the opening 25o preferably has a semi-circular profile (with the arc oriented for its apex to face the liquid filling front, which further reduces the angle $\alpha$ formed at each of the lateral walls 27, 28 of the channel 20. This improves the stability and therefore allows longer time retention of the liquid L at the trench 25.

Several improvements can be contemplated to further improve the stability of the pinned liquid. For example, assuming the opening 25o has a semi-circular profile, the radius of curvature of the profile is preferably made slightly larger than the half width of the microchannel 20. This, as present Inventors have realized, makes it possible to achieve stronger retention capability; this point is further discussed in section 2. As illustrated in the accompanying drawings (see in particular FIGS. 1C and 9), the radius of curvature and the half width of the channel are both measured in the plane (x, z), i.e., the plane of the bottom wall 26 of the channel 20; the width of the channel is measured along axis z in FIG. 1C.

The dimensions of the trench 25 can be optimized. For example, referring to FIGS. 1A, 1D, 2B, and 6-8, the trench 25 is preferably processed so as to have a minimal depth of ~0.9 µm (±0.1 µm), which depth is essentially constant. The depth of the trench is measured perpendicularly to the bottom wall 26 of the channel 20 (i.e., along y). Now, although any depth length may be contemplated, in principle, to provide a pinning effect, experiments have shown that a channel depth larger than or equal to ~1.4 µm (i.e., 1.4±0.1 µm) favors a stable, long-lasting liquid pinning at the trench in practice (retention times of several 10 s of min can then be achieved).

In addition, the trench 25 is preferably processed so as to have a width (along x) that is larger than or equal to 5 µm (±0.1 µm). The width of the trench is measured parallel to the bottom wall 26 of the channel 20, in the direction x of propagation of the liquid, contrary to the width of the channel 20, which is measured along z. The width of the opening 25o is, however, less critical than the depth of the trench in practice, as Inventors concluded from experiments. Yet, providing a trench width of at least 5 µm makes it possible to relax the resolution requirements for photolithography.

Referring now more particularly to FIGS. 1, 2 and 6, the electrode 21 and the trench 25 are preferably structured so as for the electrode to coat (at least partly) one or more walls of the trench 25 and/or one or each of the longitudinal edges that define the opening 25o of the trench 25. This way, electrodes can easily be obtained, e.g., by patterning the electrode after having opened the trench 25. For example, Pd electrodes may be used, which are 80-nm thick and are deposited on a 5 nm Ti adhesion layer (using e-beam evaporation), as in FIG. 2B. Thus, the electrode material may not be in direct contact with the walls of the trench 25. Other materials can be contemplated for the contacts 21, 21c, 22, see sect. 2.

Figure 9A:
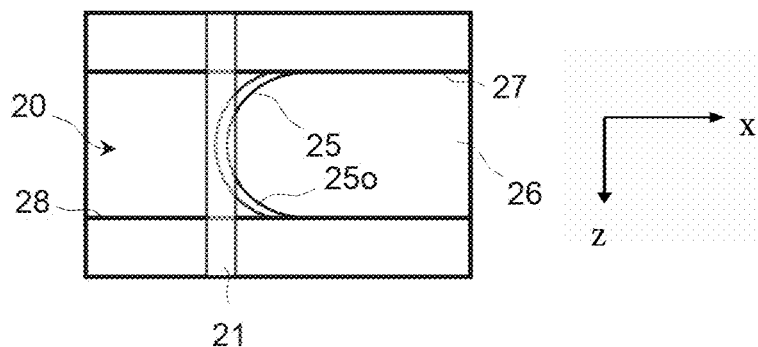
FIG. 9A-9D illustrate various possible configurations where the electrode overlaps the trench.
Figure 9B:
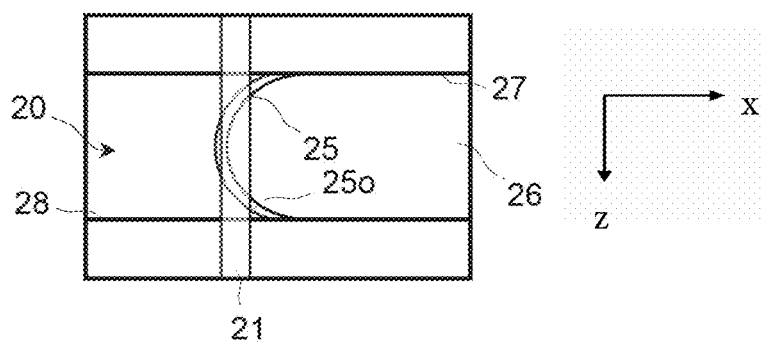
Figure 9C:
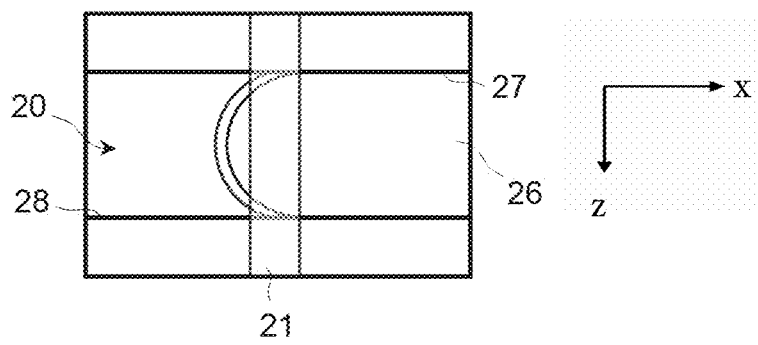
Figure 9D:
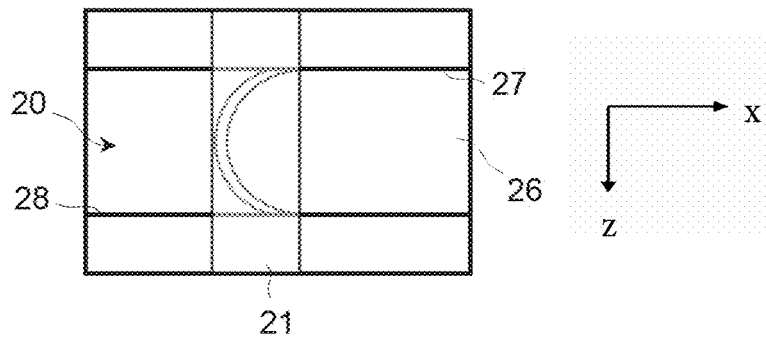

The electrode contact 21 may notably coat the upstream edge of the opening 25o (at least partly, for example at the level of its apex, as in FIG. 9A). This, as one may realize, allows the liquid flow to be more efficiently resumed by electrowetting, as the electrode contact 21 coats the edge where the liquid is pinned. The electrode may further advantageously coat the opposite (downstream) edge, to help the liquid pass the second edge when resuming the flow, as in FIG. 9A or 9B. Benefits (in terms of reaction times) were further observed by the inventors when the electrode contact 21 happens to coat the longitudinal edges of the opening 25o at the level of the external angles $\alpha$ formed by the trench 25 with the lateral walls 27, 28 of the channel 20. Accordingly, the electrode contact 21 may advantageously coat all the features of the trench, as in FIG. 9D.

As illustrated in FIGS. 1 and 2, the electrode 21 is preferably patterned as a metal strip that extends across the flow path (along axis z), so as to coat the bottom wall of the trench 25, as well as its opposite walls (at least partly). This substantially eases the fabrication process. Interestingly yet, the patterned electrode 21 does not need to fully coat the trench to obtain the desired electrowetting effect. In fact, and as seen in FIG. 2B, the electrode 21 may only partly coat the bottom wall of the trench 25 (not the entire arc is coated by the Ti/Pd layer in this example). The bottom wall of the trench will typically be parallel to the bottom wall 26 of the channel 20. In addition, the electrode 21 may only partly coat one or each of the opposite sidewalls of the trench 25. These sidewalls are contiguous with and on each side of the bottom wall of the trench 25.

The metal strip 21 may further be patterned so as to coat regions neighboring the trench 25, upstream and/or downstream the liquid-pinning site, so as to cover the longitudinal edges of the trench 25, as discussed earlier. More generally, various electrode configurations can be contemplated (as illustrated in FIGS. 9A-9D), provided that the electrode contact 21 extends in the vicinity of the edges of the trench 25. And precisely, the trench configuration adopted here makes it easy to pattern the electrode contact 21 directly at or close to the pinning edges, contrary to a burst valve configuration. This, in turn, allows lower actuation voltage to be used.

The embodiments of FIGS. 1 and 2 requires to first open a trench 25 and then pattern the electrode 21. However, this is not a strict requirements. For example, in the embodiment shown in FIG. 7, the microfluidic device 1a comprises a substrate 10 and the electrode 21 is formed as a layer on top of the substrate 10. A layer 11 of dielectric material partly covers the substrate 10 (as well as the electrode layer 21). The top surface of the layer 11 forms the bottom wall 26 of the channel 20. The curved trench 25 is formed within the layer 11, so as for the trench 25 to reach the layer 21 underneath. Note that if the substrate 10 is electrically conductive, then an intermediate dielectric material layer 23 is needed.

Figure 8:
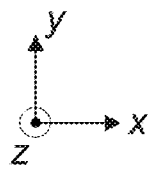
Figure 8:
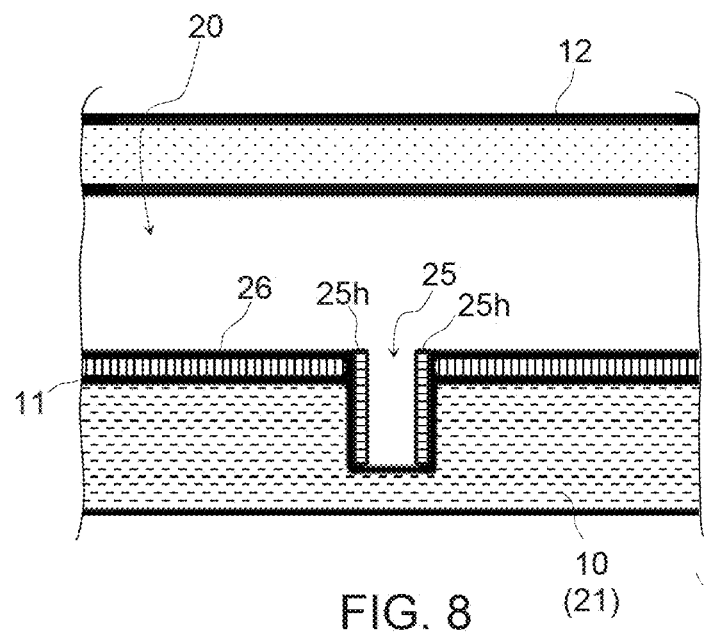

In other variants, such as illustrated in FIG. 8, the device 1b comprises an electrically conductive substrate 10, which can thus be leveraged to act as an electrode 21, provided certain conditions are met. First, the trench 25 needs to reach into the conductive substrate 10. Second, the latter need be appropriately connected (or connectable) so as to serve as an electrode. In the example of FIG. 8, a thin layer 11 of dielectric material partly covers the substrate 10, so as to a form the bottom wall 26 of the microchannel 20, and the trench 25 is formed through the layer 11, so as to reach into the conductive substrate 10.

As seen in the accompanying drawings, the trench 25 typically has a rectangular cross-section, whereby opposite sidewalls are contiguous with and on each side of a bottom wall of the trench 25. As further seen in FIG. 8, one or each of the opposite sidewalls of the trench 25 is preferably coated with a hydrophobic material layer 25h, so as to enhance the stopping capability of the gate.

The retention capability of a trench can otherwise be further increased by altering the surface of the electrode 21 and/or the flow path, in the vicinity of the electrode. For instance, in embodiments, the electrode 21 at the trench 25 may comprise a metal layer with a self-assembled monolayer of organic molecules (e.g., $HS(CH_2)_{19}CH_3$) arranged thereon, to make the electrode more hydrophobic. In variants, an array of capillary structures may be arranged over the electrode 21 and/or on the flow path so as for this array of structures to be contiguous with the electrode 21, as in the inset of FIG. 5. For example, the electrode can be castellated and preceded with an array of tiles to slow down an incoming liquid meniscus and pin it stronger along the upstream edge of the trench 25.

The present devices may notably be embodied as POCD devices. Particularly appealing are devices implementing a flow control mechanism where volumes of samples and reagents, flow rates, and flow paths can easily be adapted after fabrication.

According to another aspect, the invention can also be embodied as a method for controlling a flow of liquid in a microfluidic device such as described above. Aspects of such a method and variants thereto have already been described earlier.

Next, and according to a final aspect, the invention can also be embodied as a method of fabrication of microfluidic devices 1, 1a, 1b such as described herein. Several fabrication processes can be contemplated, depending on the desired device structure. Generally, the present fabrication processes aim at fabricating a microchannel 20 that includes a liquid-pinning trench 25 such as described earlier (i.e., forming an opening 25o that extends across and transversally to the flow path defined by the channel 20), as well as an electrode contact 21 extending across the flow path so as to at least partly overlap the trench 25. The fabrication of the devices preferably involves a substrate 10, e.g., made of silicon (Si), glass, polymer or metal, one or more dielectric layers 11, 23 (e.g., made of $SiO_2$), polymeric features 27-29 and a seal 12.

In preferred embodiments such as illustrated in FIG. 6, the fabrication of the channel 20 involves depositing a layer 11 of material to form a bottom wall 26 of the channel 20. I.e., the top surface of the layer 11 serves as a wall 26 subtending the liquid flow path. Then, a trench 25 is opened in the deposited layer 11 of material (FIG. 6A). The electrode contact 21 is subsequently patterned on top of the opened trench 25, for the electrode contact 21 to coat (at least partly) the bottom wall of the trench 25 and/or sidewalls thereof (FIG. 6B). If necessary, a second electrode 22 is patterned, preferably during the same processing step. Such a process makes the gate 21, 25 very simple to fabricate and is further more versatile, inasmuch as structural and chemical characteristics of the trench 25 and the electrode 21 can easily be adapted.

Figure 7:
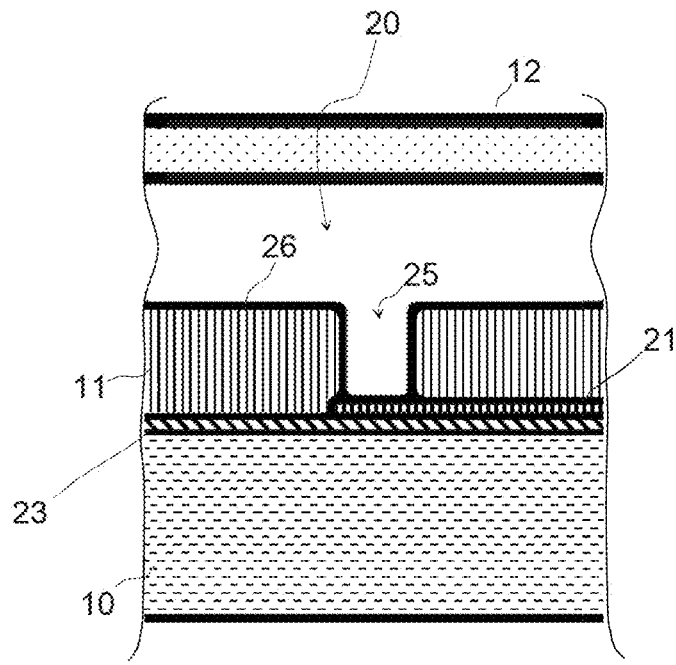
FIGS. 7 and 8 show 2D cross-sections of microfluidic devices according to variants to the device FIGS. 1A-1D.

In variants such as illustrated in FIG. 7, one may instead first deposit a layer of material 21 on top of a substrate 10, so as to form the electrode contact 21, and then deposit a second layer 11 of material, on top of the first layer 21, to form the bottom wall 26 of the channel 20. The trench is finally opened in the second layer 11, for it to reach the first layer 21 forming the electrode. An intermediate layer 23 of dielectric material is typically needed if the substrate 10 is electrically conducting.

In still other variants, such as illustrated in FIG. 8, the electrically conductive substrate 10 is used in lieu of the electrode 21, for it to act as an electrode contact 21. A layer 11 of material is deposited on top of the substrate 10, to form the bottom wall 26 of the microchannel 20. Finally, the trench 25 is opened in the layer 11, so as to reach into the conducting substrate 10.

In each case (FIG. 6, 7 or 8), the channel 20 can be completed using any suitable technique. For example, lateral polymer structures can be fabricated (e.g., in SU-8 or using a dry film resist) to form lateral walls 27, 28, 29 (FIG. 6C), and a lid (e.g., a dry film resist) can subsequently be laminated on top (FIG. 6D) to seal the microfluidic device, as discussed in more detail in sect. 2. Typical side views or cross-sections of the resulting devices 1, 1a, 1b are respectively shown in FIGS. 6D, 7, and 8.

The above embodiments have been succinctly described in reference to the accompanying drawings and may accommodate a number of variants. Several combinations of the above features may be contemplated. Examples are given in the next section.

2. Specific Embodiments—Technical Implementation Details

2.1 Preferred Embodiments 2.1.1 On-Top Electrodes, FIGS. 1, 2

A first type of embodiments is now described in detail, which concern devices where the trench is opened in a dielectric material and electrodes are patterned on-top.

A large edge discontinuity is etched on the bottom surface of the microfluidic channel to form a trench forming an ellipsoidal shape transversal to the flow direction. The convex side of the semicircular shape is oriented so as to face the flow source. A metal electrode is designed to lie below the meniscus of the liquid pinned at the edge of the trench.

As illustrated in FIG. 1A, the gate keeps closed when the liquid stops at the edge of the ellipsoidal trench due to geometrical effects. Liquid flow is resumed along the channel by applying a DC voltage pulse between the liquid and the metal contact 21, FIG. 1D.

The layer structure of the device 1 shown in FIGS. 1, 2 successively involves (from the bottom to top): a substrate 10 (e.g. Si, polymer, epoxy, metal sheet), whose thickness can range from 10 μm to several mm; a dielectric material 11 (e.g., $SiO_2$, polymer, epoxy); a patterned electrode layer 21 (e.g., made of Pd, Au, or Pt); channel walls 27-29 (e.g., epoxy, tape, polymer); and a cover layer (e.g., dry-film resist, glass, polymer, adhesive tape).

This device may for example be fabricated as follows (FIGS. 6A-6D). A hydrophilic-insulating layer 11 (e.g., $SiO_2$, at least 2 μm thick) is deposited on top of a Si substrate 10. An ellipsoidal trench is etched using a dry etching process (e.g., based on an inductively coupled plasma [ICP] technique), FIG. 6A. A tilting angle of 40° is used for the deposition of metal contacts 21, 22, by metal evaporation and lift-off, FIG. 6B. The metal contact 21 is deposited on top of the trench 25. Eventually the contact is partially deposited into the depth of the trench 25. Channel end walls 29 are fabricated using a SU-8 photoresist, FIG. 6C. Finally, a dry film resist is laminated, FIG. 6D.

A semi-circular may be processed in place of the ellipsoidal trench, where the metal electrode follows the semi-circular shape of the trench. In all cases, the electrode 21 may cover the bottom of the trench as to keep closer to the meniscus. The gate activation conditions are similar in both cases.

2.1.2 Bottom Electrode, FIG. 7

As shown in FIG. 7, a device 1a having a bottom electrode configuration may successively involve: a substrate 10; a dielectric layer 23 (needed if the substrate 10 is electrically conductive); an electrode contact layer 21; a hydrophilic dielectric layer 11; channel walls 29; and a cover layer. The metal contact is deposited before processing the trench 25. The materials used in layers 10, 11, 21 can be such as listed in sect. 2.1.1.

The dielectric layer 11 covers a substantial part of the substrate 10, including the metal contact 21. An ellipsoidal-like trench is patterned at the position desired for the gate and etched into the layer 11 until it reaches the metal contact surface 21.

In detail, the device 1a may for example be fabricated as follows. A thin dielectric layer 23 (e.g., $SiO_2$) is deposited on top of the bulk Si substrate 10. All metal contacts 21, 22 are deposited on the insulating layer 23. The hydrophilic-insulating layer 11 is deposited using Plasma Enhanced Chemical Vapor Deposition (PECVD). The trench is etched into layer 11 using a Reactive Ion Etching (ME) or ICP process, until it reaches the metal contact 21. The channel sidewalls can be fabricated and patterned using a SU-8 photoresist. Finally, a dry film resist is laminated on top of the lateral walls of the channel.

2.1.3 Trench in Conductive Substrate, FIG. 8

In a device 1b such as depicted in FIG. 8, a semicircular trench 25 is patterned on a thin hydrophilic-insulating layer 11 and etched deep into a bulk Si substrate 10. A hydrophobic layer 25h (e.g., $C_4F_8$) is deposited on the sidewalls of the trench during the etching, e.g., using Deep Reactive Ion Etching (DRIE), to enhance the stopping capability of the trench 25. Alternatively, trenches containing spiky microstructures (e.g., black Si) are formed in the Si substrate using DRIE (with a modified recipe). Such microstructures increase the contact angle of the liquid through the trench.

The fabrication process is simpler (less fabrication steps) than the process used for device 1a. The resulting device 1b, however, is merely suitable for applications where activation of a single gate is required. Its operation remains similar to that of devices 1, 1a. I.e., a liquid L introduced in the channel 20 stops at the trench 25. There, the wettability of the liquid can be increased by applying a voltage pulse between the liquid and the conductive substrate 10. Note that the activation of multiple gates can nevertheless be made possible by depositing a conformal insulating layer (e.g., $Al_2O_3$) on top of the area containing the spiky microstructures before patterning the electrodes, e.g., as in device 1a.

2.1.4 Microfluidic Chip Designs (FIG. 2A)

A chip implementing multiple electro-gates 21, 25 using a common electrode 21, 21c can be designed for applications where electrogating of subsequent gates on a same channel is pursued, such as illustrated in FIG. 2A. In the device shown in FIG. 2A, all metal contacts 21 of the gates 21, 25 are connected to a single common electrode (negative electrode) 21c. The liquid L is biased using the secondary electrode 22 (it acts as a positive electrode). The liquid stops at one of the gates 21, 25. A DC voltage pulse is applied between the liquid L (via a second electrode contact, not shown) and electrode 21c and the capillary flow is resumed until it is stops at the next gate. The next gate will be activated by again applying a DC voltage pulse between the two electrodes. The process repeats, as necessary, at all the gates. A low-voltage pulse (<10 V) suffices to induce the activation at each gate. The required voltage does not increase from one gate to the next one. The time response of the electrogating operation slightly increases from one gate to the other (typically within a range from 0 to 1 s). I.e., a slightly longer pulse need be applied at the next gate. As further seen in FIG. 2A, several channels 20 and flow paths can be implemented in parallel. Each common electrode 21c may for instance be connected to a respective pad 15 of a microSD-like socket or an electrical interface using pogo pin connectors.

In variants, a chip implementing multiple electro-gates may be designed, which relies on independent metal contacts. Such a variant is similar to the chip of FIG. 2A, except that each gate involves a contact 21 that is connected independently from the other gate contacts. Again, the design is not limited by the number of flow paths used. In addition, the design is not limited by the number of contacts (gates) in the chip, as independent contacts are relied on. Similar to the operation of the chip of FIG. 2A, the liquid meniscus gets pinned at the edge of each trench. A low activation DC voltage is applied (<10 V) and the time response is short (<1 s).

In other variants, the chip implements a single electrogate per flow path. Such a chip may possibly leverage a conductive substrate (e.g., Si), used as an electrode (as in FIG. 8). No additional metal contacts (electrodes) are needed in that case, since the Si substrate acts as the negative electrode. Still, a secondary electrode in contact with the liquid is needed. The gate activation is triggered by a short voltage pulse (<3 s) of low voltage (<6 V). The response time after applying the voltage is typically less than 1 s. The depth of the trenches is typically of about 3 μm, or larger. For example, a 10 μm deep trench can be used to achieve a retention time that exceeds 1 hour. Larger trench depths need slightly larger activation voltages.

Several other variants can be contemplated, based on the teaching of the present document, as the skilled person may appreciate.

2.2 Detailed Example of Implementation

This section provides a detailed description of electro-actuated valves for flow control of liquid in capillary-driven microfluidics, based on an approach that is efficient, reliable, fast, and requires low voltage.

FIGS. 1A-1D captures the operating principle of such an electro-gate. The gate involves a geometric discontinuity in the flow path, i.e., a trench in the bottom wall 26 of a microchannel 20, and a metal electrode 21 patterned so as to overlap the trench. A second electrode 22 is patterned under the loading pad 14 to create electrical contact with a liquid sample L. The liquid sample L is pipetted on the loading pad 14 of the chip 1, which spontaneously fills the hydrophilic flow path (due to capillary forces) and then gets pinned at the edge of the trench 25 when no bias voltage is applied between the two electrodes (see FIG. 1A).

In FIG. 1B, δ is the angle between the meniscus and the bottom surface in contact with the liquid, and $\theta_t$ and $\theta_b$ are the advancing contact angles of the liquid in contact with the top and bottom surface of the channel, respectively. The channel is assumed to be wettable and has a rectangular cross-section of height h. The references F, F' and F" respectively denotes the liquid filling front as the liquid: (i) approaches the trench; gets pinned at the trench; and (iii) overcomes the trench, as depicted in FIGS. 1A, 1B and 1C.

Liquids with a low surface tension and/or liquids in very hydrophilic microchannels may not be optimally pinned by a mere straight trench (i.e., extending orthogonal to the microchannel). That is, when such a liquid gets pinned at a straight trench, its meniscus may possibly extend along the upper and lateral walls of the microchannel, which in turn might impact the pinning mechanism. To avoid this, one may instead provide a trench having a curvature, e.g., a semicircular shape (FIG. 1C). Curving the meniscus to make it more "parallel" to lateral walls (α<<90°, FIG. 1C) was experimentally found to substantially improve the stability of the pinning as long as α<$\alpha_{crit}$ (critical value of a above which pinning fails).

Figure 1D:
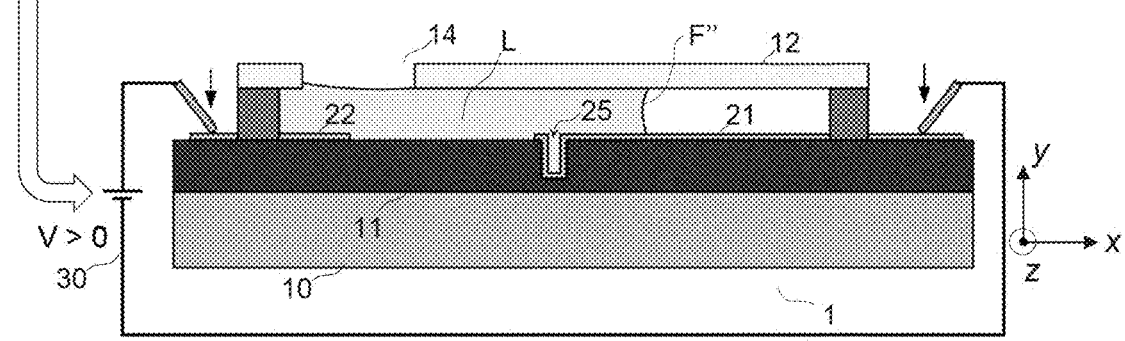

Yet, the liquid pinning can be suppressed in a controlled manner using electrowetting, i.e., by applying a DC potential between the liquid and the electrode at the gate (FIG. 1D). The applied voltage induces changes in the advancing contact angle θ of the meniscus on the electrode due to a decrease of the liquid-solid surface tension ($\gamma_{LS}$). As shown in FIG. 1C or 2B, the electrode at the gate can be partially deposited into the trench to enable electrowetting across the trench. The contact angle is expressed as a function of the applied voltage through the Lippmann-Young's equation:

$$\cos\theta = \cos\theta_0 + \frac{cV^2}{2\gamma_{LG}}$$

where $\theta_0$ is the contact angle when V across the liquid-surface interface is zero, and $\gamma_{LG}$ is the liquid-gas surface tension. Once the surface and electrical energy are balanced by reducing $\gamma_{LS}$ during the electrowetting, capillary forces drive the flow along the microchannel until the next gate (if any) is reached.

Electro-gates as described above are very simple to fabricate. In addition, the characteristics of the trench and the electrode can easily be changed. The present Inventors have notably implemented such gates on a microfluidic chip using: (i) an N-doped (1-10 ohm-cm) Si substrate 10 covered with an insulation layer 11 (e.g., 2.5-μm-thick thermally grown $SiO_2$); (ii) trenches etched into the $SiO_2$ layer 11 using dry etching (e.g., at least 1.4-μm deep); (iii) Pd electrodes, typically 80-nm-thick and deposited on a 5 nm Ti adhesion layer using e-beam evaporation; (iv) 15-μm-deep and 200-μm-wide microchannels fabricated in SU-8; and (v) a dry film resist (DF-1050, EMS Inc., USA) laminated at ~45° C. to seal the microfluidic chip 1. These fabrication steps are illustrated in FIG. 6.

Figure 2C:
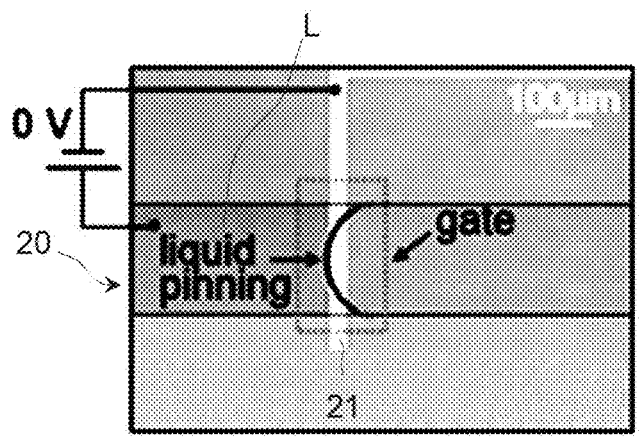
FIGS. 2C and 2D are optical images of a device involving a gate such as depicted in FIG. 2B, respectively showing a phosphate-buffered saline (PBS) solution pinned at a gate and after activation of the gate.
Figure 2D:
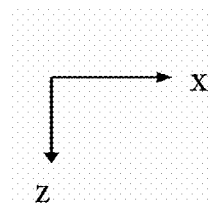
Figure 2D:
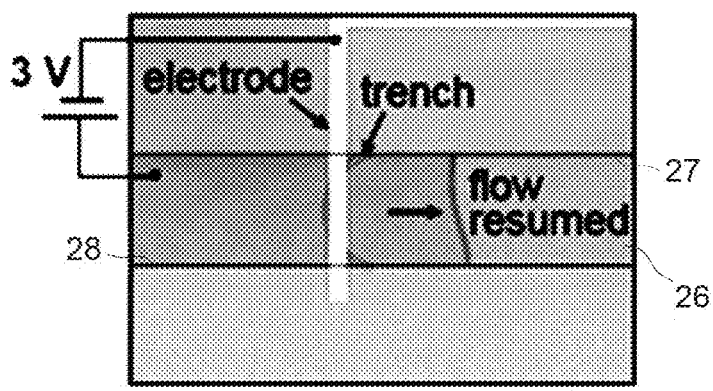
Figure 2E:
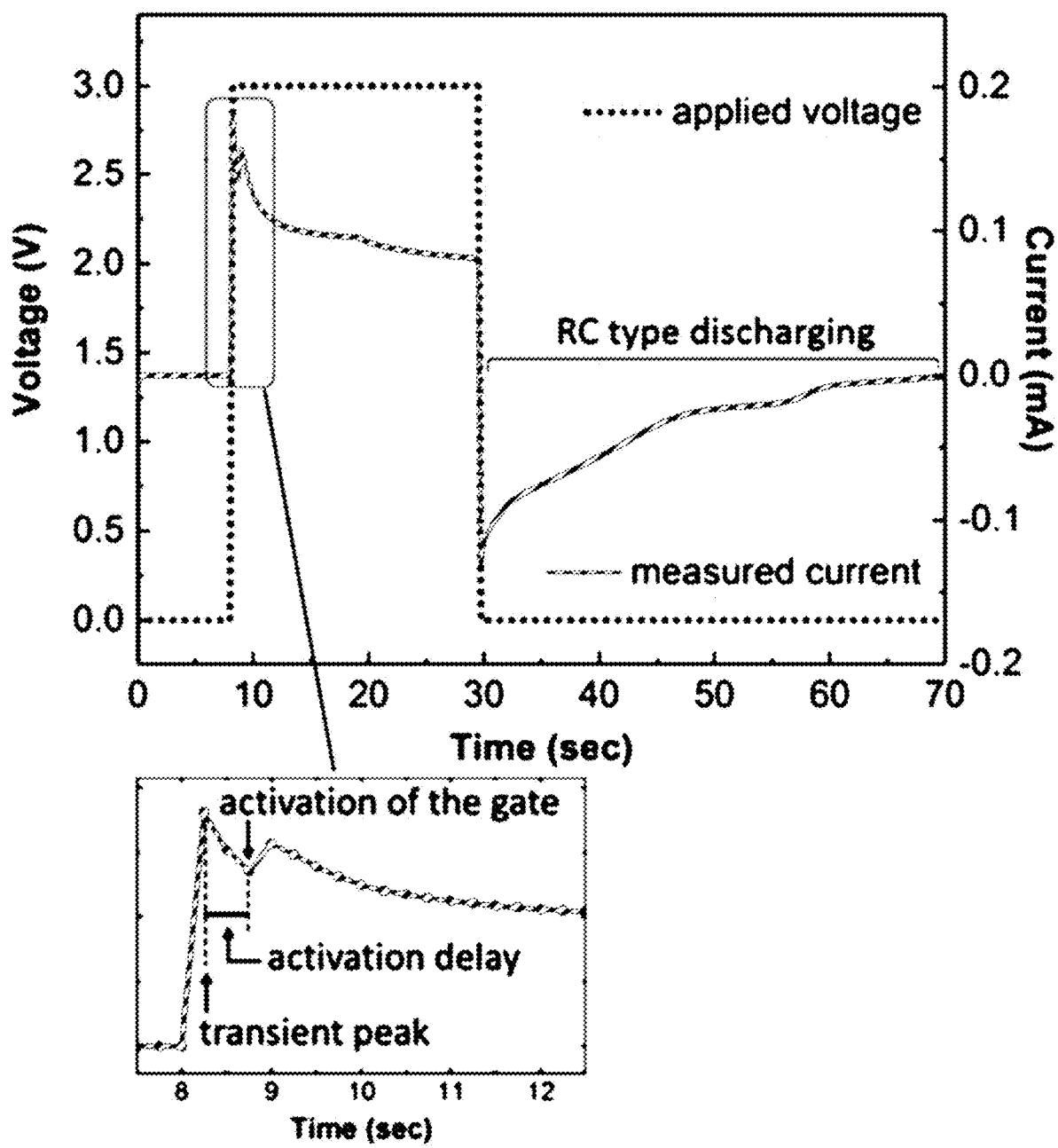
FIG. 2E is a graph illustrating an example of a characteristic curve of a current vs. time, as obtained in response to a direct current voltage pulse applied between a liquid and a gate, in a device as shown in FIGS. 2B-2D.

In particular, a microfluidic chip containing six parallel channels and two gates per channel was designed and tested (not shown), similar to the chip of FIG. 2A. All six flow paths are serviced by a common loading pad that can accommodate a few microliters of sample. FIG. 2B shows such a trench and Pd electrode. FIG. 2C illustrates stop-and-go flow control of a phosphate-buffered saline (PBS) at a gate where the solution is pinned at the edge and released upon applying a 3 V bias. A current vs. time characteristic of the gate during activation is shown in FIG. 2D, where the inset highlights a typical transient in current at the rising edge of the applied voltage pulse, and a local minimum in current when the activation of the gate occurs. The time elapsed between the transient and this minimum represents the activation delay, i.e., the time the electrowetting process needs to enable liquid actuation through the gate. The time step for the curve in the inset is 0.25 s, which indicates an activation delay of about 0.5 s for PBS when applying an activation voltage of 3 V.

Three key performance characteristics of the gates are: (i) the time of retention of liquid (with a 0 V bias); (ii) their activation delay; and (iii) their activation voltage. As expected from the pinning stability mechanism introduced by the curved geometry of the trench 25, the retention time substantially depends on the value of the angle α, which can be changed with the curvature of the trench. Experiments performed by the Inventors have demonstrated that increasing the radius of curvature of the trench reduces its retention capability (FIG. 3).

A trench having a radius of curvature equal to half the width of the channel (100 μm) should have the smallest possible angle α, and therefore the best retention capability. However, experiments have shown that trenches having a radius of curvature slightly larger than half the width of the channel (120-135 μm) turned out to exhibit a substantially stronger retention capability. Such trenches have a small angle α and are large enough to extend across the channel without any potential gap in case of misalignment during microfabrication. As a approaches $\alpha_{crit}$ (here corresponding to a radius of ~300 μm), the efficiency of the pinning mechanism weakens (<2 min) or may even breaks down for trenches having exceedingly large radii of curvature (larger than 500 μm). A hydrophilic dry film resist (DF-3020, EMS Inc., USA, less hydrophilic than DF-1050) was further tested, which yielded retention times longer than 30 min. For completeness, the pinning stability was found to be quite independent from the width of the trench.

Figure 4:
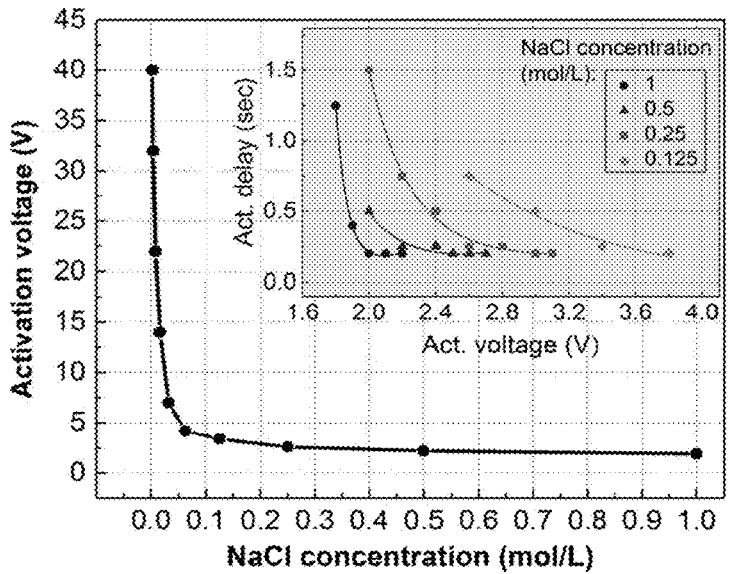
FIG. 4 shows the activation voltage of a gate (as involved in embodiments) for aqueous solutions of NaCl of increasing concentrations, as a function of the ionic concentration of the NaCl solutions (circles). The inset shows the activation delay of the gate as a function of the bias voltage for solutions with high NaCl concentrations. The lines serve as a guide for the eye.

Because electrowetting is influenced by the conductivity and ionic concentration of the liquid, the present Inventors have further investigated the actuation voltage and the actuation delay of gates such as described above for aqueous solutions of NaCl of increasing concentrations, FIG. 4. For NaCl concentrations larger than 0.05 M, a voltage of 5 V was found to be sufficient to activate the gate. At lower NaCl concentrations, even down to 3.9 mM, this activation is still possible using short pulses of higher voltage without bubble formation. NaCl samples having a concentration of ~125 mM require an actuation voltage of ~3.3 V. This is consistent with the actuation voltage of the gate (3 V) that is required with a PBS solution, which is based on a NaCl concentration of 137 mM, FIG. 2D. Moreover, the inset in FIG. 4 shows an activation delay of 0.5 s when applying a voltage of 3 V for actuation of the gate with a 125 mM NaCl solution, in agreement with the 0.5 s delay measured in FIG. 2D for PBS. The inset in FIG. 4 illustrates that a slightly increased activation voltage makes it possible to decrease the activation delay.

Figure 5:
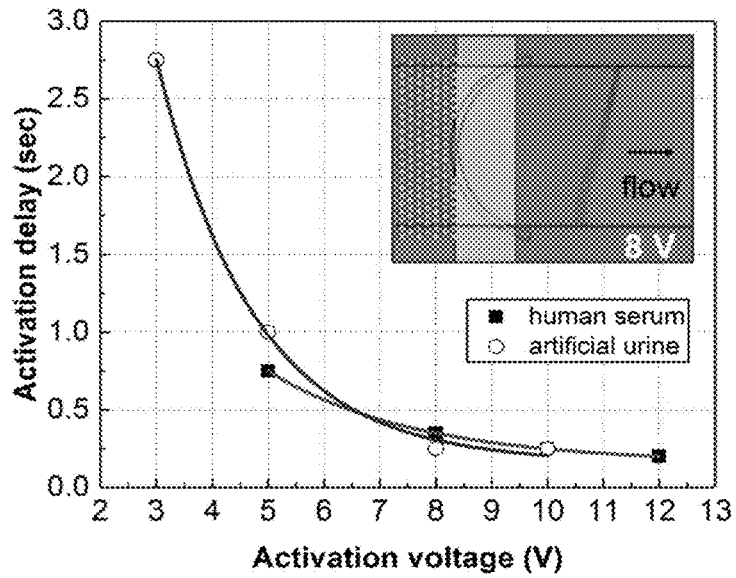
FIG. 5 shows the activation delay of a gate as involved in embodiments, as a function of the activation voltage for human serum (plain squares) and artificial urine (open circles). The continuous lines are guides for the eye. The inset is an optical microscope image showing the resumed flow of human serum after applying an 8 V bias to the gate. The image shows microstructures patterned upstream of the trench and electrode.
Figure 6A:
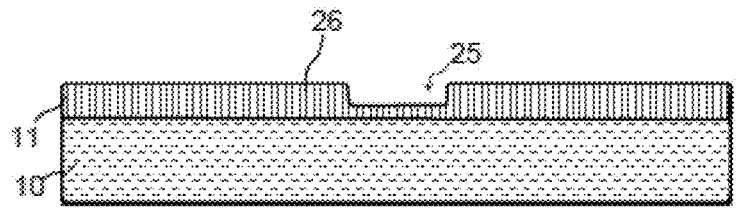
FIGS. 6A-6D (collectively FIG. 6) schematically represent high-level steps for the fabrication of a silicon (Si) microfluidic chip having a gate such as depicted in FIGS. 1A-1D, according to preferred embodiments.
Figure 6B:
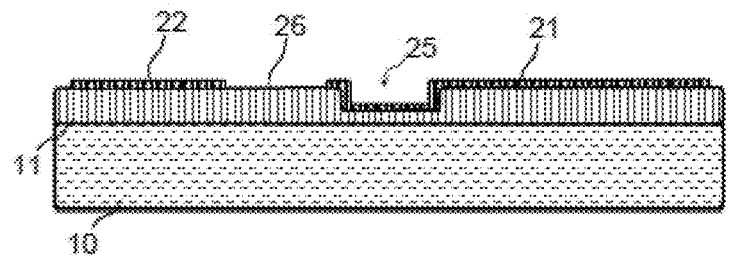
Figure 6C:
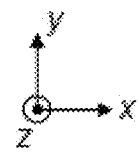
Figure 6C:
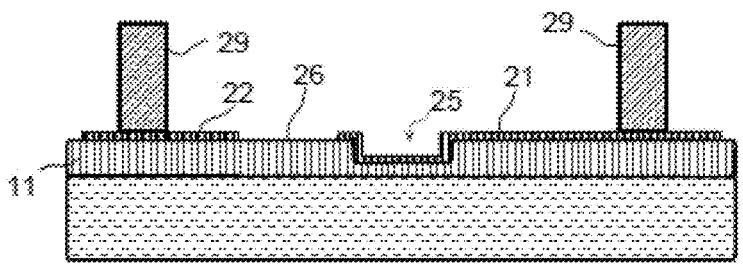
Figure 6D:
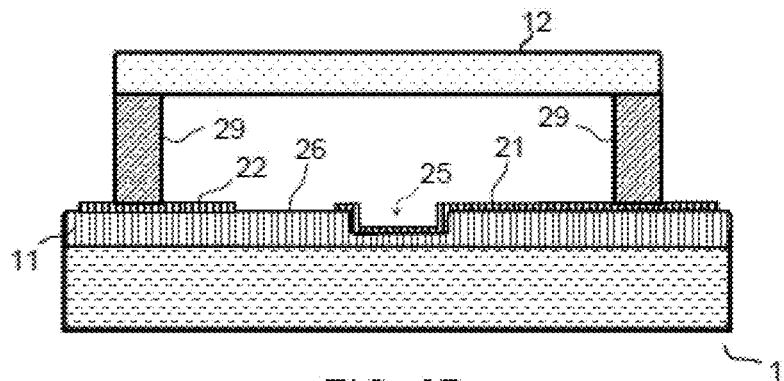

Human serum is an important sample for POCDs. Now, such a sample can be hard to pin in capillary-active channels due to reactive spreading, i.e., phenomena where proteins and amphiphilic molecules increase the hydrophilicity of a surface by adsorption from the solution. There, the retention capability of a gate can be increased by modifying the surface chemistry of the electrode. This may for instance easily achieved using a self-assembled monolayer to make the Pd electrode more hydrophobic. The electrode can also be castellated and preceded with an array of tiles to slow down the incoming meniscus and pin it stronger along the electrode (inset in FIG. 5). This way, retention times longer than 40 min can be achieved (for human serum), and an activation voltage between 5 V and 10 V can be used, together with an activation delay of 1 s or less. The present gates were also successfully tested with artificial urine (FIG. 5).

In summary, embodiments described in this section are directed to an efficient, reliable, and easy-to-implement flow control mechanism in capillary-driven microfluidics. Unlike other techniques based on hydrophobic barriers or electrowetting-on-dielectric principles, the present methods use a simple geometrical pinning effect, which can easily be fabricated using techniques that are already compatible with many POCD devices employing microfluidics and electrodes. Thanks to the low voltages (<10 V) required to resume the flow, flow control can further be achieved using a compact and portable system 50, e.g., via smartphone connectivity. This also makes the technology very flexible by using a generic chip architecture and just downloading a flow protocol from a smartphone 50 (FIGS. 1A-1D). Such possibilities can be expected to have considerable impact on the field of microfluidics-based POCD by reducing the design time required for each assay and by enabling portable diagnostics platforms without compromising the performance.

While the present invention has been described with reference to a limited number of embodiments, variants and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other materials than those explicitly mentioned can be contemplated, as well as different layer structures, dimensions, and fabrication processes.

What is claimed is:

1. A microfluidic device comprising:
  a body having a microchannel formed therein and a liquid-pinning trench formed therein; and
  an electrode that at least partly overlaps the liquid-pinning trench;
  wherein:
  the microchannel is defined by microchannel walls and defines a flow path for a liquid;
  the liquid-pinning trench is defined by at least one trench wall and has an opening, and a depth of the trench extends transversally to a flow direction imposed to the liquid by the microchannel, in operation;
  the microchannel walls include a bottom wall and a first lateral wall and a second lateral wall, the first lateral wall being arranged on a first side of, and contiguous with, the bottom wall, the second lateral wall being arranged on a second side of, and contiguous with, the bottom wall, whereby the opening of the trench extends across the bottom wall; and
  the at least one trench wall has a curvature, whereby an outline of the opening of the trench has a convex shape when viewed perpendicular to the bottom wall, a first tangent to said outline at a first intersection point forming an acute external angle with the first lateral wall in a plane of the bottom wall, and a second tangent to said outline at a second intersection point forming an acute external angle with the second lateral wall in the plane of the bottom wall.

2. The microfluidic device according to claim 1, wherein the curvature of the at least one trench wall is semicircular and a radius of curvature of the at least one trench wall is larger than a half width of the microchannel, wherein each of said radius of curvature and said half width is measured in a plane of the bottom wall.

3. The microfluidic device according to claim 1, wherein the opening of the trench is defined by two longitudinal edges and the electrode coats at least one of said two longitudinal edges at the first and second intersection points.

4. The microfluidic device according to claim 3, wherein the electrode fully coats the liquid-pinning trench, including said two longitudinal edges.

5. The microfluidic device according to claim 1, wherein the liquid-pinning trench has a constant depth, which is larger than or equal to 0.9 μm, the constant depth measured perpendicularly to a plane of the bottom wall.

6. The microfluidic device according to claim 5, wherein said constant depth is larger than or equal to 1.4 μm.

7. The microfluidic device according to claim 5, wherein the device further comprises an array of microstructures arranged on the electrode and/or on the bottom wall so as for the array to be contiguous with said electrode.

8. The microfluidic device according to claim 1, wherein the opening of the trench is defined by two longitudinal edges and the electrode coats, at least partly, one or more walls of the liquid-pinning trench and/or one or each of said two longitudinal edges.

9. The microfluidic device according to claim 8, wherein the electrode is patterned as a metal strip.

10. The microfluidic device according to claim 1, wherein the body comprises:
- a substrate, the electrode formed as a layer on top of the substrate; and
- a layer of dielectric material that partly covers the substrate, so as to form the bottom wall, wherein the liquid-pinning trench is formed within the layer of dielectric material, so as for the liquid-pinning trench to reach the layer forming the electrode.

11. The microfluidic device according to claim 1, wherein the microchannel is further defined by a cover opposite said bottom wall, and
- the cover has an aperture suited for introducing liquid in the microchannel.

12. The microfluidic device according to claim 1, wherein said electrode is a first electrode and the device further comprises a second electrode, the second electrode electrically insulated from the first electrode and configured so as to be contacted by a liquid introduced in the microchannel, in operation.

13. The microfluidic device according to claim 12, wherein
- the device further comprises voltage control means connected to the first and second electrodes and configured to apply a direct current voltage between the first and second electrodes.

14. A microfluidic device comprising:
- a body having a microchannel formed therein and a liquid-pinning trench formed therein; and
- an electrode that at least partly overlaps the liquid-pinning trench;
- wherein:
- the microchannel is defined by microchannel walls and defines a flow path for a liquid;
- the liquid-pinning trench is defined by trench walls and has an opening, and a depth of the trench extends transversally to a flow direction imposed to the liquid by the microchannel, in operation;
- the microchannel walls include a bottom wall and a first lateral wall and a second lateral wall, the first lateral wall being arranged on a first side of, and contiguous with, the bottom wall, the second lateral wall being arranged on a second side of, and contiguous with, the bottom wall, whereby the opening of the trench extends across the bottom wall;
- the trench walls comprise a bottom trench wall and opposite sidewalls that are contiguous with and on a respective side of the bottom trench wall; and
- one or each of the opposite sidewalls are coated with a hydrophobic material layer.

15. A microfluidic device comprising:
- a body having a microchannel formed therein and a liquid-pinning trench formed therein; and
- an electrode that at least partly overlaps the liquid-pinning trench;
- wherein:
- the microchannel is defined by microchannel walls and defines a flow path for a liquid;
- the liquid-pinning trench is defined by at least one trench wall and has an opening, and a depth of the trench extends transversally to a flow direction imposed to the liquid by the microchannel, in operation;
- the microchannel walls include a bottom wall and a first lateral wall and a second lateral wall, the first lateral wall being arranged on a first side of, and contiguous with, the bottom wall, the second lateral wall being arranged on a second side of, and contiguous with, the bottom wall, whereby the opening of the trench extends across the bottom wall; and
- said electrode comprises a metal layer with a self-assembled monolayer of molecules arranged thereon.

16. A microfluidic device comprising:
- a body having a microchannel formed therein and a first liquid-pinning trench formed therein and a second liquid-pinning trench formed therein;
- a first electrode; and
- a second electrode;
- wherein:
- the microchannel is defined by at least one microchannel wall and defines a flow path for a liquid;
- the first liquid-pinning trench is defined by at least one trench wall and has an opening that extends across at least a portion of the at least one microchannel wall, and a depth of the first liquid-pinning trench extends transversally to a flow direction imposed to the liquid by the microchannel, in operation;
- the second liquid-pinning trench is defined by at least one trench wall and has an opening that extends across at least another portion of the at least one microchannel wall, and a depth of the second liquid-pinning trench extends transversally to the flow direction imposed to the liquid by the microchannel, in operation;
- the second electrode is electrically insulated from the first electrode and is configured so as to be contacted by a liquid introduced in the microchannel, in operation; and
- the first electrode is formed from a set of first electrode contacts, each contact of the set of first electrode contacts extending so as to at least partly overlap a respective one of the first and second liquid-pinning trenches, wherein the first electrode contacts are connected, so as to form the first electrode as a single, common electrode.

* * * * *